Oct. 15, 1968  P. T. BADDER  3,405,502
APPARATUS FOR FORMING COMMODITY BEARING SACHETS FROM
PRESSURE SENSITIVE OR HEAT SEALABLE MATERIAL
Filed Aug. 7, 1964  2 Sheets-Sheet 1

United States Patent Office 3,405,502
Patented Oct. 15, 1968

3,405,502
APPARATUS FOR FORMING COMMODITY BEARING SACHETS FROM PRESSURE SENSITIVE OR HEAT SEALABLE MATERIAL
Peter Thomas Badder, Slough, England, assignor to Aspro-Nicholas Limited, London, England, a British company
Filed Aug. 7, 1964, Ser. No. 388,068
Claims priority, application Great Britain, Aug. 13, 1963, 31,957
12 Claims. (Cl. 53—51)

ABSTRACT OF THE DISCLOSURE

A machine for producing packages from thermoplastic film which continually feeds the film in web form through margin crimp rolls to form a tube and hence through transverse crimp rolls which divide the tube into a series of closed pockets, each containing a commodity previously fed in through a feed tube, the transverse crimp rolls being driven by constant speed drive and the margin crimp rolls having a variable speed drive in parallel with the drive to the transverse crimp rollers for print registration control purposes.

---

This invention relates to apparatus for forming commodity bearing sachets from webs of pressure sensitive or heat sealable material of the type in which a pair of material webs, or a folded over web, passes continuously through a co-acting pair, or co-acting pairs of laterally spaced rotating crimp rolls (hereinafter referred to as the margin crimp rolls), which bond the web margins together to form a tube, and the tube then passes through a co-acting pair of transverse crimp rolls, each formed with one or more crimp bars protruding from the periphery, which bars interact on rotation of the rolls to continually form spaced transverse crimped seals along the tube and thus produce a series of continuous sachets, each sachet meanwhile having received a commodity from a feed device protruding into the tube. The apparatus normally embodies a guillotine knife for separating the satchets by cutting along the transverse seals.

Now if the material web, or webs, carry repetitive printing, embossing, or like marking (hereafter for simplicity referred to as printing), it may be desirable that this be maintained in accurately aligned registration with respect to each sachet, and one known method of seeking to obtain registration control consists in driving the margin crimp rolls through a constant speed drive, whilst the transverse crimp rolls are driven through an automatically controlled variable speed drive, arranged in series with the drive to the margin crimp rolls, and emanating from the same drive source. The automatic control for the variable speed drive is responsive (for example by the incorporation of photoelectric cell means) to the passage of the printing on a web, such that the speed of the transverse crimp rolls may be automatically varied to ensure that each transverse seal (formed by a pair of co-acting transverse roll bars) is correctly registered with respect to the web printing.

A disadvantage of the above system of print registration control, however, is the inevitability of "slip" occurring in the variable speed drive to the transverse crimp rolls, this slip being magnified due to the fact that intermittent shock loads are imposed on the apparatus, in timed relation to the action of the transverse crimp bars, by the guillotine knife and commodity feeding device.

The slip in the device may adversely affect the speed of the transverse crimp rolls and consequently lead to inaccuracies in print registration control.

It is an object of the present invention to provide, in apparatus of the type indicated, an improved print registration control system, and in this respect we have now found that by driving the margin crimp rolls and transverse crimp rolls in parallel, either from the same or different drive sources, and by applying an automatically controllable variable speed drive to the margin crimp rolls, instead of as previously to the transverse crimp rolls, more accurate print registration control may be achieved.

By this arrangement, of driving the transverse crimp rolls at constant speed in parallel with the variable speed drive to the margin crimp rolls the intermittent shock loads which occur in timed relation to the operation of the transverse crimp rolls, are confined to the constant speed section of the apparatus, so that their effect on the variable speed drive, leading to inaccuracies in print registration, is minimized.

Accordingly the invention consists in sachet forming apparatus of the type indicated wherein the drives to the margin crimp rolls and transverse crimp rolls are arranged in parallel, means being provided for varying the speed of the drive to the margin crimp rolls with respect to the speed of the drive to the transverse crimp rolls.

The invention further consists in sachet forming apparatus of the type indicated wherein the transverse crimp rolls are provided with a constant speed drive, and the margin crimp rolls are provided with a variable speed drive arranged in parallel with the constant speed drive to the transverse crimp rolls.

The invention still further consists in apparatus as set out in either of the two preceding paragraphs which includes means for automatically controlling the speed of the drive to the margin crimp rolls in response to the passage of repetitive web printing through the apparatus, to maintain said printing accurately registered, within limits, with respect to each sachet.

(By the expression "parallel drives" is meant drive trains which function independently so that the loads or speed variations affecting one drive train are not transmitted to the other. The drives may emanate from the same or different drive sources.)

The invention will now be described by way of an example with reference to the accompanying drawings in which.

Figure 1:
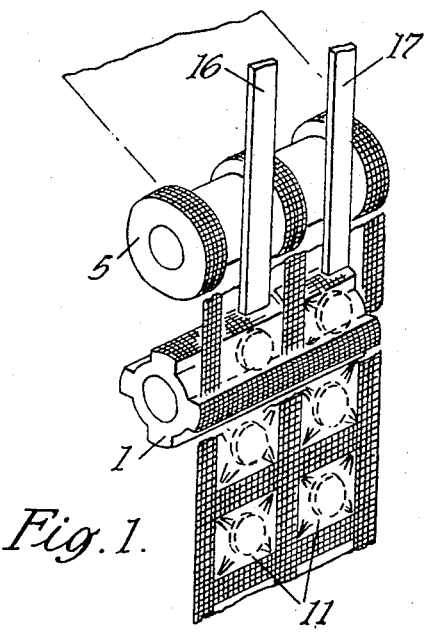
FIGURE 1 is a diagrammatic perspective view of the principal elements of a sachet forming machine, one margin roll and one transverse roll having, for clarity, been omitted.
Figure 3:
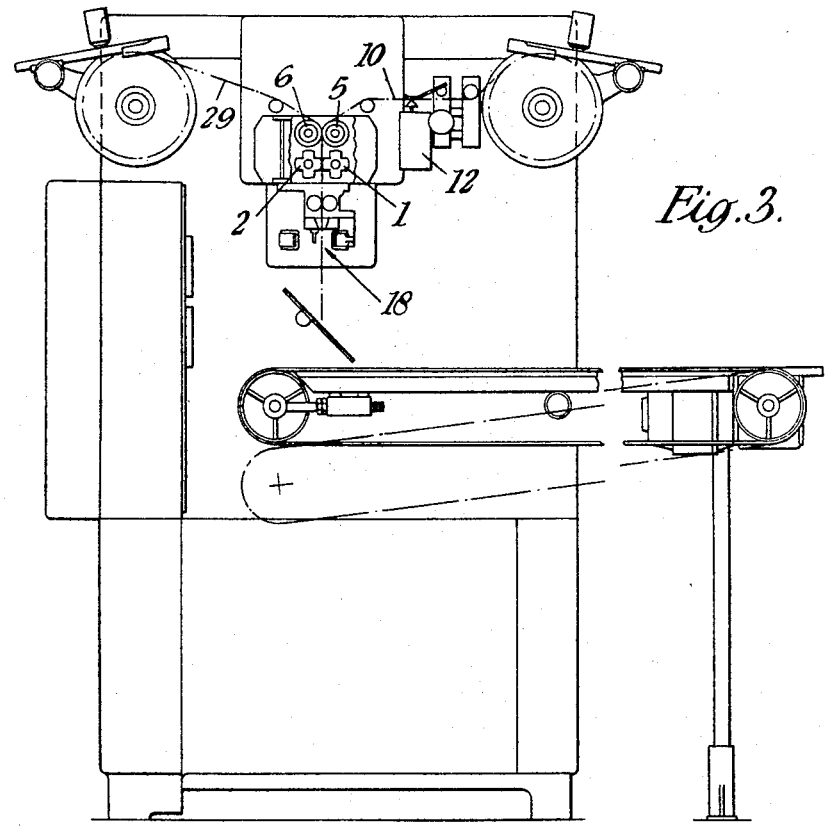
FIGURE 3 is a front view of the machine.
Figure 2:
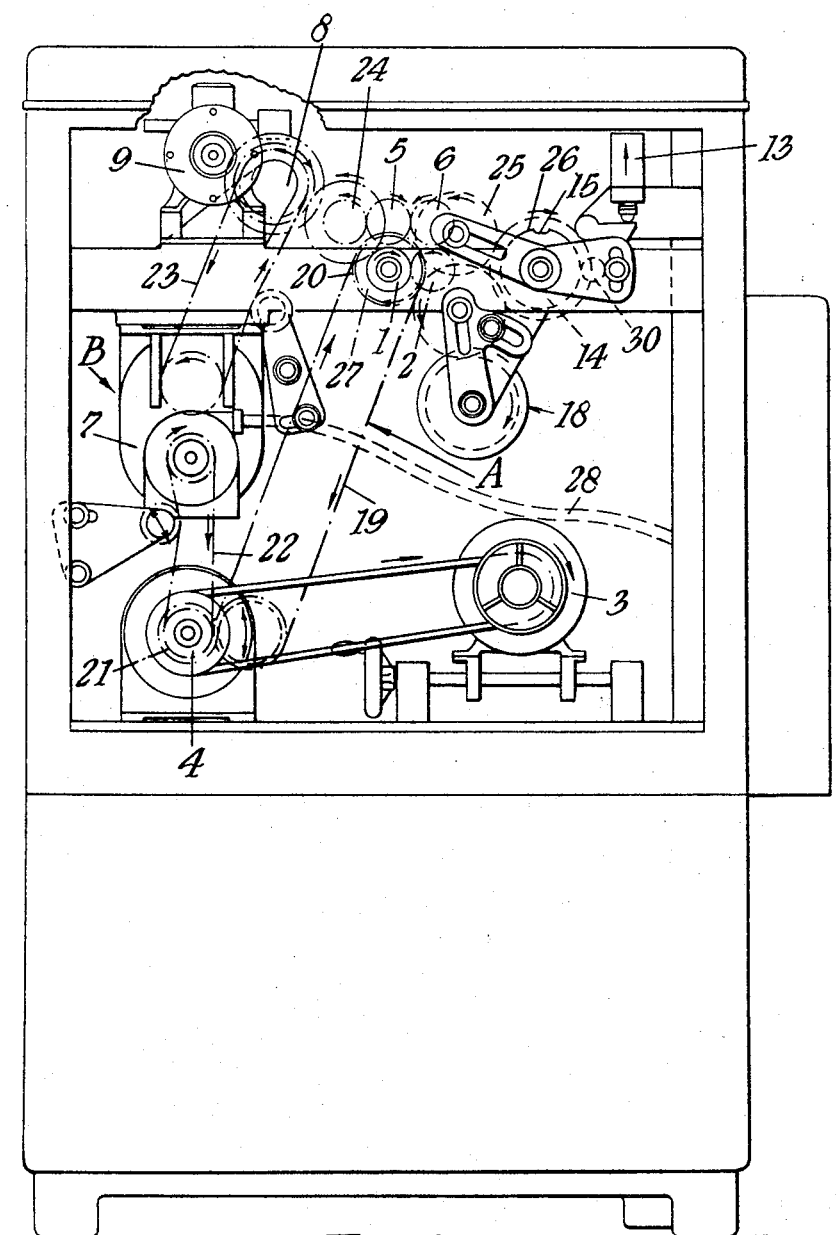
FIGURE 2 is a rear view of the machine with cover plates removed, showing the drive trains for the crimping rolls

A satchet forming machine having margin crimp rolls, 5 and 6, transverse crimp rolls, 1 and 2, filling devices, 16 and 17 (not shown in FIGURES 2 and 3) and guillotine knife equipment, generally indicated by 18, is provided with a constant speed drive train generally indicated by A for the transverse crimp rolls, a variable speed drive train generally indicated by B for the margin crimp rolls, which emanates from the same motor drive source, 3, as drive train A, but which is arranged in parallel with train A and an automatic control system for the variable speed drive to maintain accurate print registration control.

The transverse crimp rolls, 1 and 2, are driven from the motor, 3, through a constant speed reduction gear box, 4, and chain drive 19, the sprocket wheel 20 of which is carried on the shaft mounting roll 1. The margin rolls 3, through a sprocket wheel 21, this drive receiving no reduction from gearbox 4, chain drive 22, variable speed reduction gear box 7 and hence via chain drive 23 through a variable speed unit 8 of epicyclic or differential type for adjusting the speed of the drive whilst this is running provided with an influencing, reversible servo motor 9 which is automatically controlled by means of a photo-electric control system to impart corrections to the speed to the margin crimp rolls, 5 and 6, for maintaining registration of the print on material web, 10, with respect to the formed sachets, 11, as will be described, and gear train 24.

The servo motor 9, is connected to a speed adjustment shaft of the variable speed drive unit 8, so that this may be rotated remotely in either the advance or retard direction by an electrical impulse received from a master relay unit, not shown. The photo-electric scanning head 12 is positioned to view the web of printed material, 10, passing through the machine, and this web is provided with repetitive print registration marks which, as each passes the photo-electric head, changes the light intensity sensed by the cell and hence the impulse transmitted to the master relay unit. The master relay unit also contains a synchronising circuit the effect of which is to cause the photo cell to influence to the servo motor to adjust the speed of the margin roll drive only when this synchronising circuit is switched on and this switching on is effected by means of a limit switch 13 controlled from a synchronising cam 14 driven through gears 25 and 26 by gear 27 carried on the shaft of the constant speed transverse crimp roll 1. The cam 14 has a single switch operating surface depression 15.

Operation is as follows:

When the machine is set up the variable speed drive is manually operated through a manual control device 28 acting on gear box 7 from a switch on the front of the machine, to control the speed of the web of printed material 10 and the other web 29 by means of the margin crimp rolls, to synchronise with the transverse crimp rolls and provide accurately print registered sachets.

When stable conditions are obtained the machine is stopped with a print registration mark directly under the photo cell 12. The synchronising cam 14 is then revolved to present the depression 15 just before the roller 30 which actuates the micro switch 13, exact location of roller 30 in front of depression 15 being determined by the amount by which the printed material is to be allowed to go out of register before a correction is put in by the automatic control system. The machine is then started again and the variable speed drive is manually upset slightly to start the web of material 10 going out of register in one direction, e.g. the variable speed drive is set so that the margin rolls rotate slightly too fast. The print will then go progressively more and more out of register. The photo-electric equipment is switched on and when the material is out of register by a certain amount, an impulse from the photo cell 12 will coincide with the roller 30 dipping into the depression 15 in the synchronising cam 14. This triggers off the master relay unit, providing power to operate (for a pre-set time cycle) the servo motor 9, causing a correction to be put into the variable speed drive by influencing unit 8 to slow down the drive to the margin rolls and return the printed material back into register. After the pre-set time cycle the servo motor 9 stops influencing unit 8 so that the variable speed drive returns immediately to the earlier slightly too fast setting. The print thus again starts going progressively more and more out of register and when the roller 30 dipping into depression 15 again coincides with an impulse from the photo cell, the cycle is repeated. By the above arrangement correction is made in one direction only, reducing the amount of variation to a minimum.

The above embodiment of the invention, given by way of example, illustrates one mode for automatically controlling the variable speed drive to the margin crimp rolls, and it will be appreciated that various modifications are possible in the control system and within the scope of the invention.

In an alternative form of control system, a pair of depressions 15 are provided in the cam 14, a pair of switches provided at 13, and two operating arms with rollers at 30, the servo motor 9 being wired so that it can influence the variable speed drive either to speed up or slow down dependent on whether it receives an impulse from one, the rollers 30 dipping into one or other of the depressions. In this case the machine is initially set up with the variable speed drive at the correct setting for print registered sachets and with the roller 30 midway between the two depressions on cam 14. When the printing goes out of register a certain amount in one direction an impulse from the photo cell will coincide with one of the rollers entering one of the depressions and thus cause the servo motor 9 to influence the drive either to speed up or slow down dependent on which depression is entered.

I claim:

1. A machine for forming commodity bearing sachets from webs of sealable material comprising at least one pair of co-operating margin crimp rolls adapted to seal the edges of said webs of material passed therethrough to form a tube, a feed device for delivering a commodity into the thus formed tube, a pair of co-operating transverse crimp rolls adapted to form spaced transverse seals in the tube to divide same into a series of contiguous commodity bearing sachets, knife equipment for separating the sachets along said transverse seals, a constant speed reduction drive train for rotating said transverse crimp rolls, and a variable speed drive train for rotating said margin crimp rolls and arranged in parallel with said constant speed drive train.

2. A machine for forming sachets from webs of sealable material comprising at least one pair of co-acting margin crimp rolls adapted on rotation to seal the edges of said webs of material fed therethrough to form a hollow tube, a pair of transverse crimp rolls adapted on rotation to form spaced transverse seals along the tube to divide same into a series of contiguous sachets, constant speed drive means adapted to rotate said transverse crimp rolls, and variable speed drive means incorporating a variable speed gear box and means for setting the output speed of said gearbox, adapted to rotate said margin crimp rolls, said constant speed drive means and said variable speed drive means being disposed in parallel with one another.

3. The machine of claim 2 and including means for manually setting the output speed of said gearbox.

4. A machine for forming sachets from webs of sealable material comprising at least one pair of mutually co-operating margin crimp rolls adapted on rotation to seal the edges of said webs of material fed therethrough to form a hollow tube, a pair of transverse crimp rolls adapted to form spaced transverse seals along the thus formed tube to divide same into a series of contiguous satchets, constant speed drive means adapted to rotate the transverse crimp rolls and variable speed drive means for said margin crimp rolls incorporating a variable speed unit operative for altering the speed of said variable speed drive means whilst said drive means is running, said variable speed drive means being disposed in parallel relationship to said constant speed drive means.

5. Apparatus for forming a series of sachets from webs of sealable material comprising at least one pair of co-acting margin crimp rolls adapted when rotated to crimp seal the edges of material webs passed through the nip between said rolls to form a hollow tube, a pair of transverse crimp rolls adapted when rotated to form spaced transverse crimped seals along the tube to divide same into a series of contiguous sachets, constant speed drive means for rotating the transverse crimp rolls, and variable speed drive means for rotating the margin crimp rolls, said constant speed drive means being arranged in parallel with said variable speed drive means, and both said drive means being adapted to be driven from a common drive source.

6. A sachet forming machine comprising at least one pair of co-operating margin crimp rolls adapted on rotation to seal the edges of webs of sealable material fed therethrough to form a tube, a pair of co-operating transverse crimp rolls adapted on rotation to form spaced transverse seals along said tube, to divide same into a series of contiguous sachets, constant speed drive means for rotating said transverse rolls, variable speed drive means for rotating said margin crimp rolls and arranged in parallel with said constant speed drive means, and control means for automatically controlling the speed of said variable speed drive means in response to the passage of repetitive web printing through the machine to maintain said printing accurately registered within limits, with respect to said sachets.

7. The machine of claim 6 wherein said control means is operative to impose a speed correction on said variable speed drive means in response to said printing going a certain degree out of register with respect to said sachets.

8. The machine of claim 7 which includes a variable speed unit in said variable speed drive means for mechanically adjusting the speed thereof whilst said drive means is running, and wherein said control means comprises sensing means for determining when the printing goes out of register by said degree, and a servo motor linked to said variable speed unit and operative in response to signals from said sensing means to activate said unit to correct the speed of said variable speed drive means.

9. The machine of claim 8 wherein the sensing means comprise a photo electric cell adapted to produce electrical impulses in timed relation to the passage of said printing, a master relay unit, a synchronising circuit within said master relay unit adapted when activated in conjunction with an impulse from said cell to actuate said servo motor and presettable rotary cam means adapted to cyclically activate said synchronising circuit in timed relation to the formation of said sachets and to activate said circuit to coincide with an impulse from said photoelectric cell when said printing goes out of register by said degree.

10. The machine of claim 9 wherein said cam means is adapted to activate said circuit through a limit switch when a roller carried by said switch dips into a depression on said cam means.

11. The machine of claim 8 wherein the servo motor is adapted to actuate the variable speed unit for a preset time period, on completion of which the variable speed unit is rendered inoperative for altering the speed of said variable speed drive means.

12. The machine of claim 2 wherein said sealable material is thermoplastic and at least one of said pairs of cooperating rolls is heated.

References Cited

UNITED STATES PATENTS

| | | | |
|---|---|---|---|
| 2,611,225 | 9/1952 | Williams | 53—180 |
| 2,718,105 | 9/1955 | Ferguson et al. | 53—5 |
| 3,077,063 | 2/1963 | Stroop | 53—180 |
| 3,109,764 | 11/1963 | Natelli | 156—582 |
| 3,022,618 | 2/1962 | Schwartz et al. | 53—180 XR |

EARL M. BERGERT, *Primary Examiner.*

M. L. KATZ, *Assistant Examiner.*